Sept. 21, 1965 W. T. REILLY 3,207,654
REINFORCED PLASTIC COVERING MATERIALS
Filed March 16, 1962 2 Sheets-Sheet 1
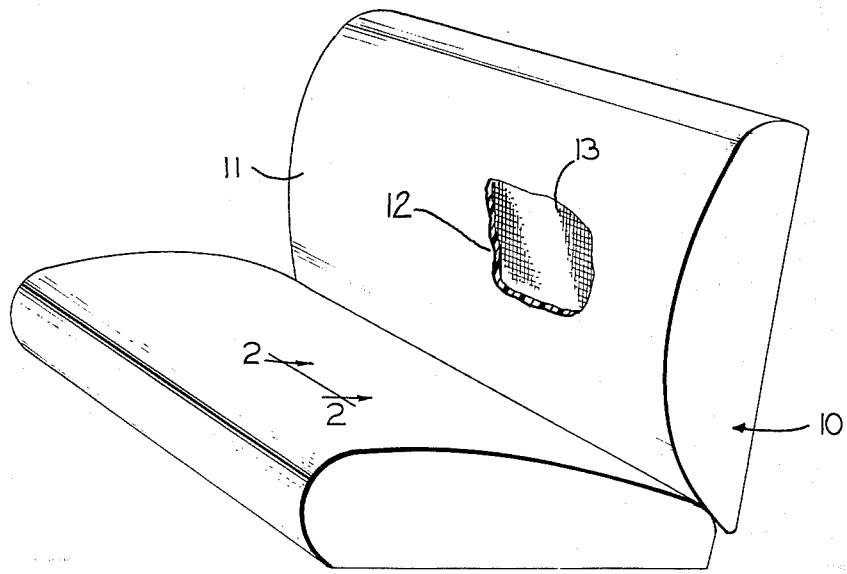
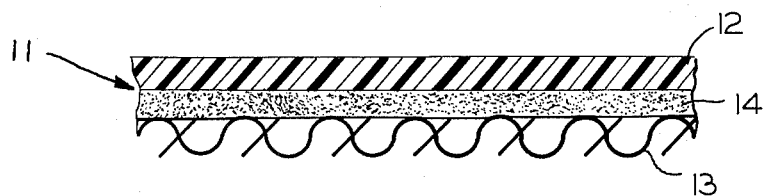
INVENTOR
WALTER T. REILLY
BY Kenyon, Palmer, Stewart & Estabrook
ATTORNEYS Sept. 21, 1965  W. T. REILLY  3,207,654
REINFORCED PLASTIC COVERING MATERIALS
Filed March 16, 1962  2 Sheets-Sheet 2

INVENTOR.
Walter T. Reilly
BY
Kenyon, Palmer, Stewart &
Estabrook
ATTORNEY

United States Patent Office 3,207,654
Patented Sept. 21, 1965

3,207,654
REINFORCED PLASTIC COVERING MATERIALS
Walter T. Reilly, Cuyahoga Falls, Ohio, assignor to The General Tire & Rubber Company, a corporation of Ohio
Filed Mar. 16, 1962, Ser. No. 180,176
3 Claims. (Cl. 161—227)

This invention relates to reinforced plastic covering materials and in particular to reinforced plastic laminations comprising plastic sheets and fabrics woven from extensible fibers.

Plastic covering materials are being used as substitutes for leather and textiles with ever-increasing frequency. These plastics are adaptable for use in covering such diverse articles as handbags, floors, walls and they are particularly useful as upholstery materials. The plastic covering materials are more durable than textile fabrics, and exhibit good hand and tensile strength.

Color can be imparted to the usually transparent plastic sheets by incorporating coloring pigments within the plastic sheets themselves or by laminating separate plastic sheets containing dispersed coloring pigments to the non-wearing surfaces of the transparent plastic sheets.

Fabric reinforcing backings are generally used in conjunction with plastic covering materials to give the plastic an improved appearance and also to increase the stiffness of the plastic and its ability to be stitched or tacked. Plastic sheets which have been reinforced with a fabric backing show a greater resistance to tearing at the point where they have been stitched than do the plastic sheets themselves.

The fabric reinforced plastic laminations can be shaped by a post-forming operation into many desired configurations. The post-forming operation is preferably carried out by subjecting the material to a multi axis stretching. In one method, vacuum forming, the lamination is placed on a mold and subjected to the combined action of heat, vacuum and pressure which causes the lamination to be irreversibly shaped to the contour of the mold.

One of the problems that has been encountered in the use of fabric reinforced plastics is the relative inability to stretch the presently commercially available fabric reinforced plastic lamination to the same degree as the plastic sheet alone. One approach to the solution of this problem is disclosed in U.S. Patent 2,812,277, where a stretchable knitted fabric is used to reinforce the plastic sheeting, the knitted fabric allowing the lamination to have limited stretchability. The use of a knitted fabric allows the lamination to be stretched as far as the stretch which has been knitted into the fabric permits, but this form of lamination cannot be used when the fabric and plastic lamination must be stretched to a greater degree.

It is an object of this invention to form a lamination of a plastic sheet and a stretchable fabric which can be post-formed to such an extent that it can be employed in covering forms or contours that could be covered by a plastic sheet without a fabric backing.

Another object of this invention is to form a plastic film and fabric laminate which is particularly adaptable for use as upholstery material, which laminate shows an improved ability to be stretched and sewn onto a base without forming wrinkles or tears.

Another object of my invention is to provide a plastic sheet with a stretchable fabric backing so that the resulting lamination will have an increased resistance to tearing at the points where it is stitched and which will retain the desired flexibility and extensibility for use in upholstery and other related uses.

The objects of my invention are accomplished by forming a lamination of a plastic sheet and a reinforcing fabric made from partially drawn fibers as more fully explained hereinbelow.

FIG. 1 is a perspective view, including a partial fragmentation, of a contoured seat to which the plastic lamination that forms the subject matter of this invention has been applied. The seat 10 is covered with the plastic lamination 11, the lamination being formed from a plastic sheet 12 and a stretchable reinforcing fabric 13.

FIG. 2 is a partial fragmentary section taken along lines 2—2 of FIG. 1 and shows the plastic sheet 12 laminated to the stretchable reinforcing fabric 13 by means of an adhesive 14.

Figure 3:
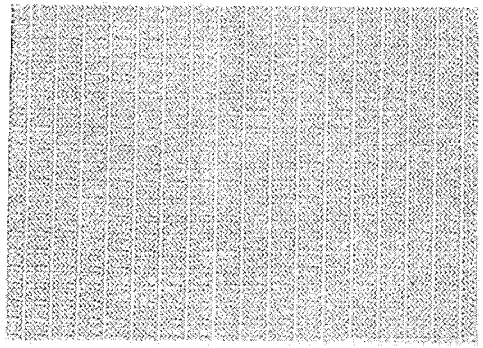
FIGURE 3 is a photograph (actual size) of a rectangular section of a piece of plastic lamination in accordance with the present invention viewed from the back or fabric side of the lamination and shows a preferred form of stretchable reinforcing knit fabric useable in forming plastic laminations of the invention.
Figure 4:
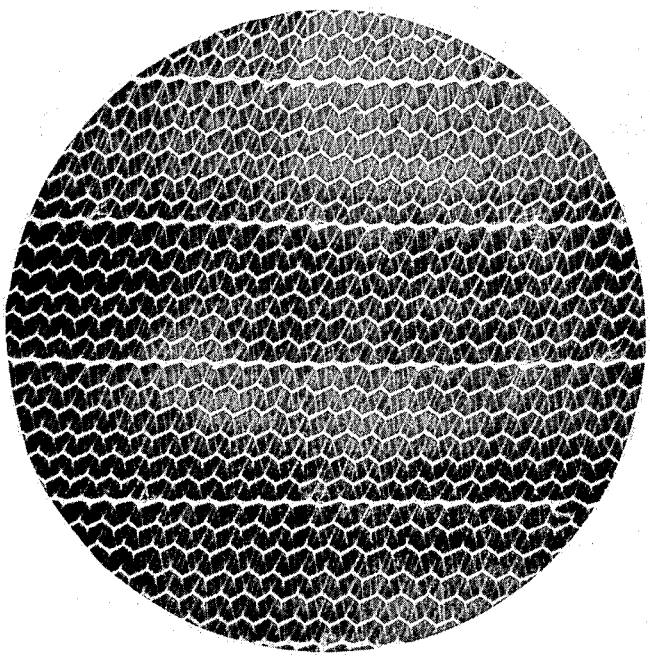
FIGURE 4 is an enlarged photograph (three times actual size) of a circular sample of the fabric shown in FIGURE 3 expanded by stretching to the extensible limit of the fabric and shows the detail of the knit of the extensible fabric.

Any plastic sheet (or film) that is capable of being stretched or molded is within the scope of the invention. Although the flexible vinyl plastics, e.g., polyvinyl chloride, polyvinylidene chloride, etc., are preferred, any other flexible, semi-rigid, or rigid plastics including polyethylene, polystyrene, polypropylene, cellulose esters, etc., plasticized if necessary, may also be employed. Plastic sheets of any suitable thickness may be used but best results are obtained with sheets of about 1–200 mils thickness and, typically 10–125 mils.

Synthetic fibers which are formed by a drawing process are adaptable for use in the reinforcing fabric. Typical fibers which are drawn, and which can be incorporated within the reinforcing fabric are polyamide fibers, polyester fibers, acrylic fibers, modacrylic fibers, vinylidene chloride fibers, polyethylene fibers, polypropylene fibers, acetate or viscose rayon fibers and any other fibers, including thermoplastic yarns, that are extensible, preferably to at least 50% of their original length and, typically, between about 100–400%. The reinforcing fabric can be formed entirely from any one of these fibers or from a combination of two or more of them where a different degree of extensibility is desired in different directions.

The fibers which make up the fabric reinforcing material may be either partially extended or totally unextended and the term "partially extended" as used in the specification and claims is intended to include totally unextended fibers. The degree to which the fibers are extended before being incorporated into the reinforcing fabric depends upon the particular application of the lamination. Post-forming operations that require an extensibility of from 0 to 200% of the lamination are feasible with the use of the partially extended or unextended fibers, depending on the extensibility of the plastic sheet.

Any method of forming the partially extended fibers can be employed. One standard method is to cold draw oversized fibers to the desired denier on multiple speed drums. Any denier of unextended fiber can be employed that suits the end applications of the lamination. Partially extended fibers of a denier of from 80–150 have been found to be satisfactory. These deniers correspond approximately to 50–70 denier fiber which has been fully extended. Partially extended fibers having an extensibility of up to 400%, typically 100–200%, are capable of being woven into fabrics which can be employed in laminations within the scope of the present invention. The reinforcing fibers may be used in unwoven form, but preferably are employed as knit or woven fabrics, e.g., plain weave or Tricot knit.

The fabric reinforcement is preferably adhesively secured to the plastic sheeting at the surface of the sheeting since the tensile strength of the resulting structure is greater than when the fabric is imbedded within the surface of the plastic sheet.

A preferred form of fiber is a partially extended nylon fiber. Depending upon the type of covering or upholstery to be made, the partially extended nylon can be incorporated with other fibers which show a greater or lesser extensibility or can compose the fabric in its entirety. Likewise, the fabric can be formed from different nylon fibers or other extensible fibers which have been drawn to different degrees.

Any form of adhesive can be employed to laminate the fabric to the plastic sheeting which will not discolor the sheeting nor injure either the sheeting, color coating or fabric. The adhesive known generally as the "curing type" of adhesive can be employed with success.

The lamination can be formed by known processes, including both the coating and calendering processes of lamination.

One of the problems encountered in the lamination of plastic sheeting and stretchable fabrics is the necessity of maintaining the dimensions of the fabric constant during the laminating process to avoid the formation of uneven laminations or the stretching of fibers in one portion of the fabric to such an extent that when the lamination is post-formed these fibers will be extended beyond their ultimate strength, resulting in the rupture of the fibers.

Methods such as that disclosed by U.S. 2,737,701 are known for maintaining the fabric in a manner so that very little stretch is applied to fabrics during the laminating operation, and these methods are advisability employed in the formation of the laminations of this invention.

A preferred method of giving the reinforcing fabric dimensional stability is to employ the use of rupturable interlinking fibers within the reinforcing fabric as disclosed by the copending application of Reilly and Turton, filed October 27, 1958, Serial No. 769,937, now U.S. 3,127,306. The use of rupturable fibers in the reinforcing fabric is particularly adaptable to the laminations of the present invention and the disclosures of the above Serial No. 769,937 are specifically incorporated within this application by reference.

The post-forming operation stretches both the plastic sheeting and fabric to the desired contour and shape in which the lamination will be employed. The stretching or forming operation draws the extensible fibers and reduces their denier and at the same time increases the tensile strength of the individual fibers.

In a specific embodiment of the invention, a plasticized polyvinyl chloride sheet of 40 mils was laminated to a Tricot knit in 5–1 rib pattern from 83–17–0.5Z bright type N13 nylon fibers. The knit fabric was coated with a curable, elastomeric-base adhesive and calendered to the plastic sheet. The fibers employed in the Tricot knit were partially drawn only to an extent that they were capable of at least 100% extensibility before rupture or breakage.

The lamination thus formed comprises a unitary material which is particularly adapted for use in upholstery and which is capable of being stretched to conform to the contour of an article to be covered. The lamination exhibits the qualities of flexibility, durability and the ability to be stretched and stitched or tacked without tearing at the points where it has been punctured due to the stitching or tacking.

The lamination was then subjected to the combined action of heat vacuum and pressure in a post-forming operation in which the laminated material was stretched and formed to the shape of a seat so that it could be stitched onto the seat frame. The post-forming operation caused the lamination to be stretched to a greater extent than would be possible if a fabric that did not contain partially drawn fibers was used.

The post-forming operation drew the partially extended nylon fibers and reduced their denier. The extensibility of the individual fibers allowed the lamination to be post-formed or stretched to a greater degree than ordinary lamination since each individual fiber of the partially extended fabric was extended as opposed to the ordinary laminations whose stretch is limited by the extent of the stretch of the knitted fabric.

I claim:
1. A moldable and stretchable covering material comprising:
    (A) a flexible vinyl sheet, and
    (B) a stretchable reinforcing fabric secured to said vinyl sheet by a layer of adhesive,
        (a) said reinforcing fabric being formed from partially extended nylon fibers,
        (b) and breakable yarns interstitched with said partially extended nylon fibers to supply dimensional stability to said fabric structure in at least one direction.
2. Reinforced moldable and stretchable plastic covering material consisting essentially of:
    (A) a flexible sheet between about 10 to 125 mils in thickness of vinyl plastic material;
    (B) a stretchable reinforcing fabric formed of:
        (a) yarns plied from relatively straight synthetic monofilaments that have been only partially drawn to an extent that they are capable of at least 50% extensibility before breakage, the stretchability of said fabric being dependent substantially entirely upon the residual drawability of the individual monofilaments to produce extended monofilaments of reduced diameter and greater tensile strength,
        (b) breakable yarns incapable of extending without breaking to the degree of said yarns (a) interstitched with said yarns (a) to supply dimensional stability to said fiber structure in at least one direction, and
    (C) an adhesive layer between said flexible sheet and said reinforcing fabric securing the sheet and fabric together,
    (D) said plastic covering material being capable of being post-formed by the combined action of heat and pressure with appreciable stretching during which individual monofilaments of the stretchable fabric portion are extended with reduction in their diameter and increase in their tensile strength.
3. Reinforced moldable and stretchable plastic covering material consisting essentially of:
    (A) a flexible sheet of about 10 to 125 mils in thickness of plasticized vinyl chloride polymer,
    (B) a stretchable reinforcing fabric formed of:
        (a) yarns plied from relatively straight nylon monofilaments having a denier of from 80 to 150 that have been partially extended to their ultimate extensibility possessing capabilities of at least 50% further extensibility before breakage, the stretchability of said fabric being dependent substantially entirely upon the residual drawability of the said nylon monofilaments to produce yarns of extended monofilaments of a denier of from about 50 to 70 and greater tensile strength,
        (b) breakable yarns incapable of extending without breaking to the degree of said yarns (a) interstitched with said yarns (a) to supply dimensional stability to said fiber structure in at least one direction, and
    (C) an adhesive layer between said flexible sheet and said reinforcing fabric securing the sheet and fabric together,
    (D) said plastic covering material being capable of being post-formed by the combined action of heat and pressure with appreciable stretching during which individual monofilaments of the stretchable fabric portion are extended with reduction in their diameter and increase in their tensile strength.

References Cited by the Examiner

UNITED STATES PATENTS

| | | | |
|---|---|---|---|
| 2,536,163 | 1/51 | Feild et al. | 161—77 |
| 2,598,090 | 5/52 | Yung et al. | |
| 2,777,310 | 1/57 | Comer | 57—140 XR |
| 2,890,567 | 6/59 | Taylor | 57—140 |
| 2,961,343 | 11/60 | Atwell. | |
| 2,996,872 | 8/61 | Porczynski | 57—140 |

EARL M. BERGERT, *Primary Examiner.*

HAROLD ANSHER, *Examiner.*

UNITED STATES PATENT OFFICE
CERTIFICATE OF CORRECTION

Patent No. 3,207,654                  September 21, 1965

Walter T. Reilly

It is hereby certified that error appears in the above numbered patent requiring correction and that the said Letters Patent should read as corrected below.

Column 4, lines 12 and 14, after "vinyl", each occurrence, insert -- plastic --.

Signed and sealed this 12th day of April 1966.

(SEAL)
Attest:

ERNEST W. SWIDER               EDWARD J. BRENNER
Attesting Officer                Commissioner of Patents